（12）United States Patent
Hertel et al.

(10) Patent No.: US 8,045,681 B2
(45) Date of Patent: Oct. 25, 2011

(54) METHOD OF OPERATING A TELECOMMUNICATIONS LINK BETWEEN TWO TELECOMMUNICATIONS DEVICES WHICH TRANSMITS DISPLAY CONTROL COMMANDS IN A SEPARATE DATA CHANNEL

(75) Inventors: Andreas Hertel, Barendorf (DE); H.-Dieter Kröger, Wakendord II (DE)

(73) Assignee: Aastra Deutschland GmbH, Berlin (DE)

( * ) Notice: Subject to any disclaimer, the term of this patent is extended or adjusted under 35 U.S.C. 154(b) by 1395 days.

(21) Appl. No.: 11/583,478

(22) Filed: Oct. 19, 2006

(65) Prior Publication Data
US 2007/0127633 A1 Jun. 7, 2007

Related U.S. Application Data

(63) Continuation of application No. PCT/DE2005/000671, filed on Apr. 14, 2005.

(30) Foreign Application Priority Data

Apr. 19, 2004 (DE) .......................... 10 2004 019 584

(51) Int. Cl.
*H04M 1/64* (2006.01)
*H04M 11/10* (2006.01)
*H04M 11/00* (2006.01)

(52) U.S. Cl. .................. 379/88.11; 455/413; 379/88.13; 379/93.17

(58) Field of Classification Search ............... 379/88.11, 379/88.13, 88.18, 142.17
See application file for complete search history.

(56) References Cited

U.S. PATENT DOCUMENTS

| 5,003,577 | A | * | 3/1991 | Ertz et al. ................... 379/88.13 |
| 6,157,705 | A | * | 12/2000 | Perrone ...................... 379/88.01 |
| 6,192,057 | B1 | | 2/2001 | Dueck et al. |
| 6,252,944 | B1 | * | 6/2001 | Hansen et al. ............... 379/67.1 |
| 2002/0055350 | A1 | * | 5/2002 | Gupte et al. .................. 455/412 |
| 2002/0073142 | A1 | * | 6/2002 | Moran .......................... 709/203 |
| 2002/0154745 | A1 | * | 10/2002 | Shtivelman ................ 379/88.12 |
| 2008/0317235 | A1 | * | 12/2008 | Hansen et al. ........... 379/211.02 |

FOREIGN PATENT DOCUMENTS

| DE | 196 30 456 A1 | 1/1998 |
| EP | 0 590 862 A2 | 4/1994 |
| EP | 1 381 212 A1 | 1/2004 |

OTHER PUBLICATIONS

Janusz Klink: "Remote data transfer in distributed measurement, diagnostics and control systems". In IEEE International Symposium on Intelligent Signal Processing, Sep. 4-6, 2003, p. 231-235.

* cited by examiner

*Primary Examiner* — Fan Tsang
*Assistant Examiner* — Solomon Bezuayehu
(74) *Attorney, Agent, or Firm* — Laurence A. Greenberg; Werner H. Stemer; Ralph E. Locher

(57) ABSTRACT

A method for operating a communications link between two telecommunications device requires that speech information be transmitted in a speech channel and data signals are transmitted in a data channel that is separate from the speech channel. This provides a particularly user-friendly, convenient method for operating a telecommunications link. To achieve this, display control commands are transmitted in the data channel as data signals, the display control commands triggering a display on a screen of the telecommunications device that receives the display control commands.

22 Claims, 1 Drawing Sheet

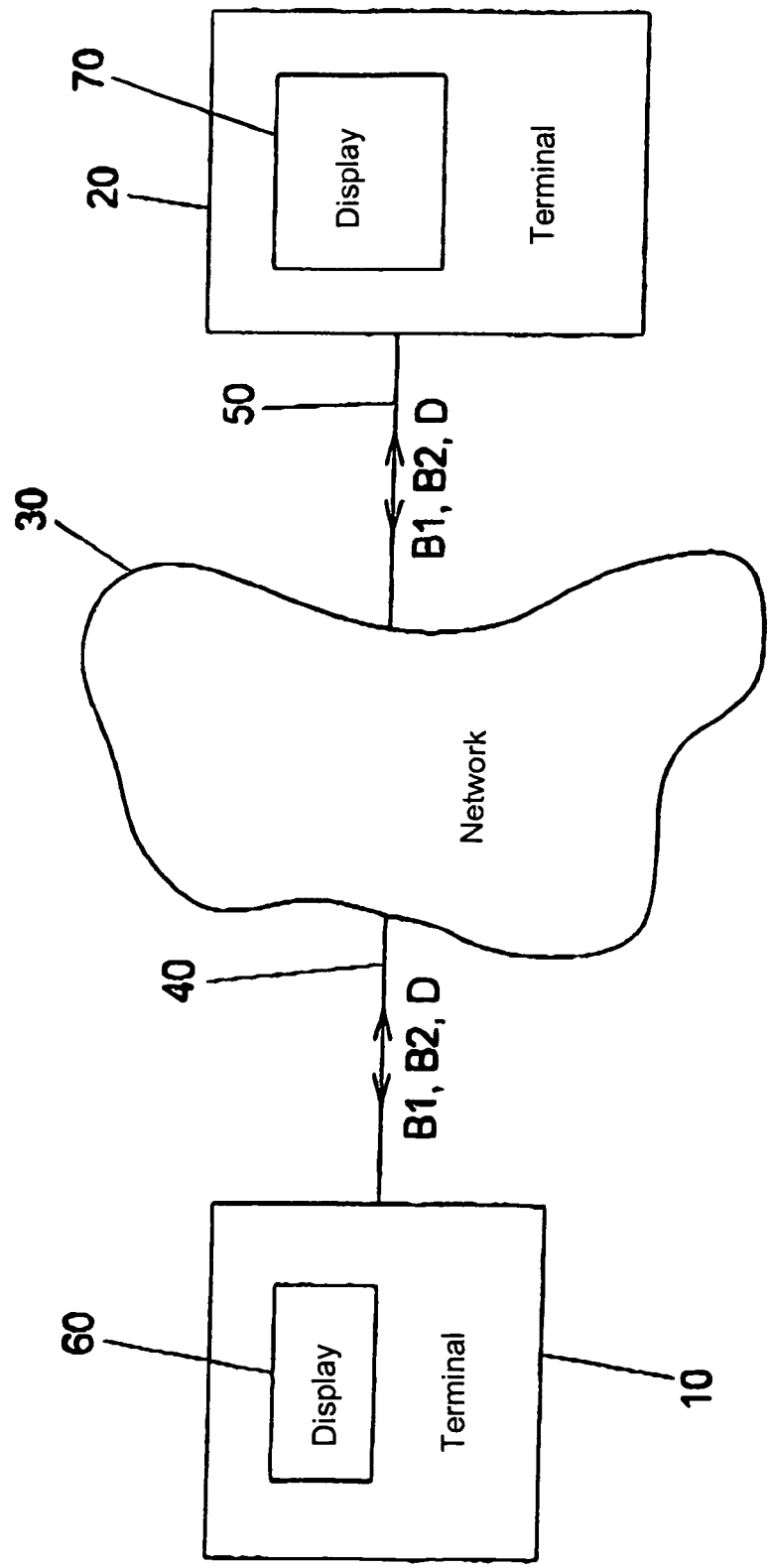

METHOD OF OPERATING A TELECOMMUNICATIONS LINK BETWEEN TWO TELECOMMUNICATIONS DEVICES WHICH TRANSMITS DISPLAY CONTROL COMMANDS IN A SEPARATE DATA CHANNEL

CROSS-REFERENCE TO RELATED APPLICATIONS

This is a continuation, under 35 U.S.C. §120, of copending international application PCT/DE2005/000671, filed Apr. 14, 2005, which designated the United States; this application also claims the priority, under 35 U.S.C. §119, of German patent application 10 2004 019 584.6, filed Apr. 19, 2004; the prior applications are herewith incorporated by reference in their entirety.

BACKGROUND OF THE INVENTION

Field of the Invention

The invention relates to a method for operating a communications link between an answering device and a telecommunications terminal. In the method, display control commands are transmitted in a data channel separate from the voice channel as data signals for triggering a display on a screen of the telecommunications terminal receiving the display control commands.

It is known that telecommunications terminals digitize audio signals in accordance with the Consultative Committee for International Telegraphy and Telephony (CCITT) standard G.711 and transmit the voice information formed in this manner in a so-called B channel in the case of an integrated services digital network (ISDN) connection. In parallel, the telecommunications terminals additionally transmit data signals with information which is used for managing the communications link in a separate data channel briefly called a D channel.

In addition, it is known that telecommunications devices can enter into data links with one another. For this purpose, the telecommunications devices transmit digital values representing a data coding instead of digitally coded audio signals in the voice channel (B channel). The information transmitted in the separate data channel (D channel) basically does not differ from the "telephony case", that is to say the case of a "normal" transmission of audio signals.

In addition, there is in global system for mobile communications (GSM) networks the so-called general packet radio service (GPRS) method in which data links are based on Internet protocols "TCP/IP" known from the Internet. In this connection, the "Wireless Markup Language" (WML), by which image data are transmitted by the known "Wireless Application Protocol" (WAP) has become successful for representing screen contents or display contents. A corresponding data link requires so-called WAP-capable telecommunications terminals; the telecommunications terminals involved must always know the respective IP address of the telecommunication partner for establishing a data link.

SUMMARY OF THE INVENTION

It is accordingly an object of the invention to provide a method of operating a telecommunications link between two telecommunications devices that transmits display control commands in a separate data channel which overcome the above-mentioned disadvantages of the prior art methods and devices of this general type, which is particularly user-friendly and convenient.

With the foregoing and other objects in view there is provided, in accordance with the invention, a method for operating a communications link between an answering device and a telecommunications terminal. The method includes establishing a communications link to a caller of the answering device by setting up a connection of a voice channel and a data channel, transmitting voice information in the voice channel, transmitting display control commands in the data channel separate from the voice channel as data signals for triggering a display on a screen of the telecommunications terminal receiving the display control commands. The transmitting of the display control commands further includes the steps of transmitting, via the answering device, a command to the telecommunications terminal resulting in a triggering of an automatic response of the telecommunications terminal to request a predetermined display content from the answering device; and transmitting, via the answering device, the predetermined display content to the telecommunications terminal after receiving the request for the predetermined display content in the answering machine.

Accordingly, it is provided, according to the invention, that between two telecommunications devices, voice information is transmitted in a voice channel (preferably D channel) and display control commands which trigger a screen display on a screen of the telecommunications device receiving the respective display control commands are transmitted in a data channel (preferably D channel) separate from the voice channel.

An advantage of the method according to the invention relates in that it ensures particularly high convenience of use because display control commands can also be transmitted in addition to voice information. For example, the name of the caller can be transmitted.

A further significant advantage of the method according to the invention relates in that the voice channel is not affected by the additional data transmission. This ensures that the voice information can be transmitted undisturbed in the normal manner—that is to say with the entire available audio bandwidth.

A third significant advantage of the method according to the invention relates in that no IP addresses need to be known for transmitting the display control commands since the display control commands are transmitted in the separate data channel after the connection has been set up in the normal manner.

The method according to the invention can be used, for example, in a communications link in which one of the two telecommunications devices involved is an answering device or by a telecommunications device handling an answering device function. The answering device function can also be provided, for example, by a network operator ("mailbox"). The telecommunications device operating as an answering device can thus transmit, in addition to the voice information, other information as display data to the caller, for example, the name of the owner of the answering device or of the "mailbox", the respective time of day, the date and in the case where audio signals are recorded on the answering device or on the "mailbox", the residual recording time available in each case can be displayed. The caller thus knows that he is connected to the correct answering device or to the correct mailbox, respectively, and how much time is still available to him for recording his voice message on the answering device or the mailbox, respectively.

The answering device or the mailbox can also be interrogated correspondingly: if the owner of the mailbox interrogates his mailbox for the purpose of interrogating audio messages received, the date, the time of day and the name of the caller, for example, is displayed to him on the screen of the telecommunications terminal used for the interrogation, in addition to the stored audio information.

The display control commands are preferably transmitted in the separate data channel in a screen-oriented access language. For example, the WML (Wireless Markup Language) or the HTML (Hyper-Text Markup Language) can be used as access language.

The WML standard represents a subset of the HTML standard.

The WML standard offers the advantage that it is very sparing with respect to the amount of data required for defining screen contents which is why the WML standard can also be used for operating telecommunications terminals with restricted data capacity. In the case of telecommunications terminals having large data capacities, particularly large memory capacities, the HTML screen language is to be recommended.

In a particularly simple and thus advantageous manner, the display control commands can be transmitted as user-to-user messages in the data channel (e.g. D channel), preferably in accordance with the ETSI rule ETS 300 102-1, chapter 4, p. 29, with a protocol discriminator "0=user specific".

In addition, it is considered to be advantageous if, in addition to the display control commands, URL (Uniform Resource Locator) information is transmitted in the separate data channel. URL information is used for requesting the next screen page selected in each case by the user or the respective next desired display content at the "partner device" with a screen setup according to the Internet standard.

URL information can be marked with the tag "<a>" both in the WML language and in the HTML language. The instructions for producing automatic responses at the partner are also largely identical in the WML language and the HTML language, for example the instructions suitable for this purpose "on-enter-forward" and "on-timer" exhibit great correspondences.

It may happen that the display control commands to be transmitted in the separate data channel have a larger volume than can be transmitted in a single data block in the data channel. For example, at the network end, the ETSI rule ETS 300 239 restricts the size of a user-to-user message to 32 bytes. This 32-byte size can be exceeded both by URL information and by display control commands according to the WML or HTML standard; in order to enable the display control commands to be transmitted nevertheless, the display control commands and/or the URL information are divided into a number of message packets and these are transmitted individually in separate user-to-user messages.

In a particularly simple and thus advantageous manner, the start of a screen content defined by a number of user-to-user messages and the end of the screen content can be detected when corresponding start and end sequences are transmitted. When a display page is transmitted in accordance with the WML standard—that is to say a "WML page"—the start of the page can be identified by the tag "<wml>" or the tag "<?xml>" in the first user-to-user message and by the tag "</wml>" in the last user-to-user message. When display contents are transmitted by the HTML language, the beginning of an HTML display page is defined either with the tag "<html>" or with the tag "<?xml>". The end of the HTML page or the completeness of the HTML page is indicated with the tag "</html>".

For the rest, it is considered to be advantageous if first the characteristics of the telecommunications devices involved are determined during the performance of the method. For example, one of the telecommunications devices involved can trigger an automatic response from the partner telecommunications device by transmitting the control commands "on-enter-forward" or "on-timer"; if the receiver of this instruction is a telecommunications device with a screen, it will return a defined URL request as immediate answer so that the transmitting telecommunications device recognizes that the display contents transmitted by it can be displayed on the partner telecommunications device.

For the rest, the method described is suitable not only for typical "voicemail" applications but for all applications in which, in addition to the unchanged audio signals, additional information is to be displayed on the display of the partner telecommunications device: for example, music titles or interpreters of music can be displayed in the cases of music on hold when in a queue.

The invention also relates to telecommunication devices. In this respect, the invention has the object of specifying telecommunication devices by which a particularly user-friendly and convenient telecommunications link can be operated.

With respect to the advantages of the telecommunications devices according to the invention, reference is made to the above statements in conjunction with the method according to the invention.

Other features which are considered as characteristic for the invention are set forth in the appended claims.

Although the invention is illustrated and described herein as embodied in a method of operating a telecommunications link between two telecommunications devices which transmits display control commands in a separate data channel, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWING

The single FIGURE of the drawing is an illustration showing two telecommunications terminals which are linked together via a public telecommunications network according to the invention.

DESCRIPTION OF THE PREFERRED EMBODIMENTS

Referring now to the single FIGURE of the drawing in detail, there is shown two telecommunications terminals 10 and 20 that are in each case connected to the telecommunications network 30 for example via a UP0, a UK0 or an S0 interface 40 and 50. Via the interfaces 40 and 50, two voice channels B1 and B2—called B channels in the text which follows—and a data channel separate from the two voice channels B1 and B2—briefly called D channel in the text which follows—are transmitted.

After the connection has been set up, voice information or audio signals, respectively, are transmitted via one of the two B channels, for example via B channel B1. Via the D channel, the management data required for setting up the connection and maintaining the connection are transmitted in a manner known per se.

In addition, display control commands which trigger a display on a screen 60 or 70 of the telecommunications device 10 or 20, respectively, receiving the respective display control commands are transmitted in the D channel. The display control commands are transmitted as user-to-user messages according to ETSI rule ETS 300 102/1 chapter 4 p. 29 with a protocol discriminator "0=user specific". The display control commands are preferably transmitted in a screen-oriented acccess language, for example in the WML or the HTML standard.

In the text which follows it is assumed as an example that the telecommunications device 10 is an answering device and the telecommunications device 20 is a telecommunications terminal 20 which calls the answering device 10.

After the connection has been set up the answering device 10 first sends to the telecommunications device 20 the command "on-to-forward" or "on-timer" which triggers an automatic response by the telecommunications terminal 20.

For this purpose, the telecommunications terminal 20 is arranged in such a manner that, after receiving the command "on-to-forward" or "on-timer", it sends a return message to the answering device 10 which indicates that it has a display device or a screen—namely a screen 70—for displaying display contents. The return message can be made, for example, in that the telecommunications terminal 20 sends back a predetermined URL information which accompanies, for example, the command of the telecommunications terminal 10.

After receiving the return message of the telecommunications terminal 20, the answering device 10 will transmit the display content requested with the URL information to the telecommunications terminal 20. For example, the answering device 10 can display the name of the owner of the answering device, the respective time of day, the date and, in the case where audio signals are recorded on the answering device 10, the remaining recording time available in each case.

If the display control commands are too extensive to be transmitted in a single user-to-user message, the display control commands are subdivided into message blocks and the message blocks are transmitted separately as user-to-user messages.

We claim:

1. A method for operating a communications link between an answering device and a telecommunications terminal, which comprises the steps of:
    establishing a communications link to a caller of the answering device by setting up a connection of a voice channel and a data channel;
    transmitting voice information in the voice channel;
    transmitting display control commands in the data channel separate from the voice channel as data signals for triggering a display on a screen of the telecommunications terminal receiving the display control commands, by the steps of:
        transmitting, via the answering device, a command to the telecommunications terminal resulting in a triggering of an automatic response of the telecommunications terminal to request a predetermined display content from the answering device;
        transmitting, via the answering device, the predetermined display content to the telecommunications terminal after receiving the request for the predetermined display content in the answering machine; and
        transmitting the display control commands without a dependency on network addresses or internet protocol addresses as the display control commands are transmitted in the separate data channel after the communication link has been established.

2. The method according to claim 1, which further comprises:
    transmitting with the command for triggering the automatic response, an information item designating a display page of the answering device which the telecommunications terminal is to call up; and
    transmitting, via the communications terminal, back to the answering machine the information item along with the request for the predetermined display content.

3. The method according to claim 1, which further comprises displaying on the display of the telecommunications terminal calling the answering device a remaining recording time available in each case which is still available to the caller for recording an audio message.

4. The method according to claim 1, which further comprises forming the answering device as a mailbox function provided by a network operator.

5. The method according to claim 1, which further comprises transmitting the display control commands in the data channel in a screen-oriented access language.

6. The method according to claim 5, which further comprising using a wireless markup language (WML) as the screen-oriented access language.

7. The method according to claim 5, which further comprises using hypertext markup language (HTML) as the screen-oriented access language.

8. The method according to claim 1, which further comprises transmitting the display control commands as user-to-user messages according to *European Telecommunications Standards Institute* (ETSI) rule *European Telecommunications Standard* (ETS) 300 102/1 chapter 4 p. 29 with protocol discriminator "0= user specific".

9. The method according to claim 1, which further comprises subdividing the display control commands into message blocks; and transmitting the message blocks separately.

10. The method according to claim 9, which further comprises transmitting the message blocks in separate user-to-user messages.

11. The method according to claim 2, which further comprises transmitting Uniform Resource Locator information as the information item.

12. An answering device for transmitting in a data channel, separate from a voice channel, display control commands for triggering a display on a screen of a telecommunications terminal receiving the display control commands, the answering device comprising:
    the answering device programmed to:
        transmit voice information in the voice channel and data signals in the data channel separate from the voice channel after a communications link between a caller of the answering device has been established;
        transmit to the telecommunications terminal via the separate data channel a command suitable for triggering a request of a display content as an automatic response of the telecommunications terminal; and
        transmit the display control commands without a dependency on network addresses or internet protocol addresses as the display control commands are transmitted in the separate data channel after the communication link has been established.

13. The answering device according to claim 12, wherein the answering device is further programmed to transmit with the command triggering the automatic response an information item which designates a display page of the answering device which the telecommunications terminal is to call up.

14. The answering device according to claim 12, wherein the answering device is further programmed to display on the display of the telecommunications terminal calling the answering device a remaining recording time available in each case which is still available to the caller for recording an audio message.

15. The answering device according to claim 12, wherein the answering device is further programmed to function as a mailbox of a network operator.

16. The answering device according to claim 12, wherein the answering device is further programmed to transmit the display control commands in the data channel in a screen-oriented access language.

17. The answering device according to claim 16, wherein the screen-oriented access language is a wireless markup language (WML).

18. The answering device according to claim 16, wherein the screen-oriented access language is a hypertext markup language (HTML).

19. The answering device according to claim 12, wherein the answering device is further programmed to transmit or receive the display control commands as user-to-user messages according to *European Telecommunications Standards Institute* (ETSI) rule *European Telecommunications Standard* (ETS) 300 102/1 chapter 4 p. 29 with protocol discriminator "0 = user specific".

20. The answering device according to claim 12, wherein the answering device is further programmed to subdivide the display control commands into message blocks and transmits the message blocks separately.

21. The answering device according to claim 20, wherein the answering device is further programmed to allocated the message blocks to separate user-to-user messages.

22. The answering device according to claim 13, wherein the information item is uniform resource location (URL) information.

* * * * *